(12) United States Patent
Thermos et al.

(10) Patent No.: US 12,321,416 B2
(45) Date of Patent: Jun. 3, 2025

(54) IMAGE DATA PROCESSING APPARATUS AND METHOD, A MODEL TRAINING APPARATUS AND A TRAINING METHOD

(71) Applicants: The University Court of the University of Edinburgh, Edinburgh (GB); CANON MEDICAL SYSTEMS CORPORATION, Otawara (JP)

(72) Inventors: Spyridon Thermos, Edinburgh (GB); Sotirios Tsaftaris, Edinburgh (GB); Alison O'Neil, Edinburgh (GB)

(73) Assignees: The University Court of the University of Edinburgh, Edinburgh (GB); CANON MEDICAL SYSTEMS CORPORATION, Otawara (JP)

( * ) Notice: Subject to any disclaimer, the term of this patent is extended or adjusted under 35 U.S.C. 154(b) by 525 days.

(21) Appl. No.: 17/524,083

(22) Filed: Nov. 11, 2021

(65) Prior Publication Data

US 2022/0147768 A1     May 12, 2022

Related U.S. Application Data

(60) Provisional application No. 63/112,822, filed on Nov. 12, 2020.

(51) Int. Cl.
    *G06F 18/214*     (2023.01)
    *G06N 3/045*     (2023.01)
    *G06T 7/00*     (2017.01)

(52) U.S. Cl.
    CPC ........ *G06F 18/214* (2023.01); *G06N 3/045* (2023.01); *G06T 7/0012* (2013.01); *G06T 7/97* (2017.01)

(58) Field of Classification Search
None
See application file for complete search history.

(56) References Cited

U.S. PATENT DOCUMENTS

| | | | |
|---|---|---|---|
| 6,549,646 B1 * | 4/2003 | Yeh | G06V 30/244 382/199 |
| 9,439,618 B2 * | 9/2016 | Heismann | G06T 7/20 |
| 2006/0267977 A1 * | 11/2006 | Barfuss | G06T 7/33 345/419 |
| 2014/0217293 A1 * | 8/2014 | Heismann | G01T 1/1603 250/363.04 |
| 2016/0100790 A1 * | 4/2016 | Cantu | A61B 5/445 600/437 |
| 2018/0165305 A1 * | 6/2018 | Wang | G06T 7/0012 |
| 2018/0225823 A1 * | 8/2018 | Zhou | G06T 7/11 |
| 2019/0259153 A1 * | 8/2019 | Zhang | G06N 3/047 |
| 2020/0311869 A1 * | 10/2020 | Reaungamornrat | G06T 5/60 |
| 2020/0364864 A1 * | 11/2020 | Shanbhag | G06T 11/008 |
| 2021/0272240 A1 * | 9/2021 | Litwiller | A61B 6/5258 |
| 2022/0147768 A1 * | 5/2022 | Thermos | G06N 3/047 |

* cited by examiner

*Primary Examiner* — Tsung Yin Tsai
(74) *Attorney, Agent, or Firm* — Oblon, McClelland, Maier & Neustadt, L.L.P.

(57) ABSTRACT

An image data processing apparatus comprises processing circuitry configured to:
    receive first medical image data;
    obtain a first image feature data set from the first medical image data;
    obtain a second image feature data set from second medical image data and/or from stored image feature data;
    obtain style data; and
    generate synthesized image data based on the first image feature data set, the second image feature data set, and the style data.

21 Claims, 12 Drawing Sheets

IMAGE DATA PROCESSING APPARATUS AND METHOD, A MODEL TRAINING APPARATUS AND A TRAINING METHOD

FIELD

Embodiments described herein relate generally to a method and apparatus for processing image data, for example for training and using a machine learning model and/or for modifying or generating image data sets.

BACKGROUND

Medical image data, obtained using a variety of imaging modalities can be used for a wide variety of diagnostic, treatment, training or other purposes. It is also known to train machine learning models, for example neural networks, on medical image data, and to use such trained machine learning models for a wide variety of tasks or purposes.

Obtaining collections of training data that are sufficiently large to include less common pathologies, which may be necessary for effective and accurate training of machine learning models, can be difficult. In particular, medical training data can be hard to acquire due to reasons of confidentiality, siloing of data in separate institutions, and rarity of certain pathologies. It can be difficult to collect training data to represent all variations that may be seen in medical imaging, for example as images can exhibit a range of both normal and pathological variation in the shape and size of the anatomy and other content that is present.

The idea of performing arithmetic operations on latent variables has been suggested, for example in the context of general computer vision tasks such as face recognition. In such tasks, content can be considered to be compositional e.g. one factor (e.g. glasses) can be superimposed on an image, without the remaining factors (e.g. face, facial features) requiring adjustment.

Medical imaging content is usually not compositional e.g. if the shape of an anatomical structure is changed, then the surrounding anatomical structures will usually require corresponding deformation/re-arrangement in order to produce a realistic image.

Spatial Decomposition Net (SDNet) is an existing semantic segmentation model that disentangles medical images into anatomical (e.g. content) and imaging-specific (e.g. style) factors. During training, the strong semantic priors imposed by segmentation masks encourage a content encoder ($E_C$) to map different factors into different channels of a spatial latent space.

There are other frameworks that use semantic priors as input to image synthesis. Two such examples are SGGAN and MaskGAN, which use segmentation masks and are applied to facial images. Usually, the output is directly specified by a mask selected from another image (SGGAN) or by user-manipulation of a source mask (MaskGAN).

BRIEF DESCRIPTION OF THE DRAWINGS

Embodiments are now described, by way of non-limiting example, and are illustrated in the following figures, in which.

DETAILED DESCRIPTION

Certain embodiments provide an apparatus comprising processing circuitry configured to: receive first medical image data; receive second medical image data and/or stored image feature data; obtain a first image feature data set from the first medical image data; obtain a second image feature data set from the second medical image data and/or from the stored image feature data; obtain style data; and generate synthesized image data based on the first image feature data set, the second image feature data set, and the style data.

Certain embodiments provide a method of processing medical image data, comprising: receiving first medical image data; receiving second medical image data and/or stored image feature data; obtaining a first image feature data set from the first medical image data; obtaining a second image feature data set from the second medical image data and/or from the stored image feature data; obtaining style data; and generating synthesized image data based on the first image feature data set, the second image feature data set, and the style data.

Certain embodiments provide a model training apparatus comprising processing circuitry configured to:r eceive a first image feature data set and a second image feature data set; generate a mixed feature data set from the first image feature data set and the second image feature data set; and train a model to generate a synthesized image data set from the mixed feature data set and style data.

Certain embodiments provide a training method, comprising: receiving a first image feature data set and a second image feature data set; generating a mixed feature data set from the first image feature data set and the second image feature data set; and training a model to generate a synthesized image data set from the mixed feature data set and style data.

Figure 1:
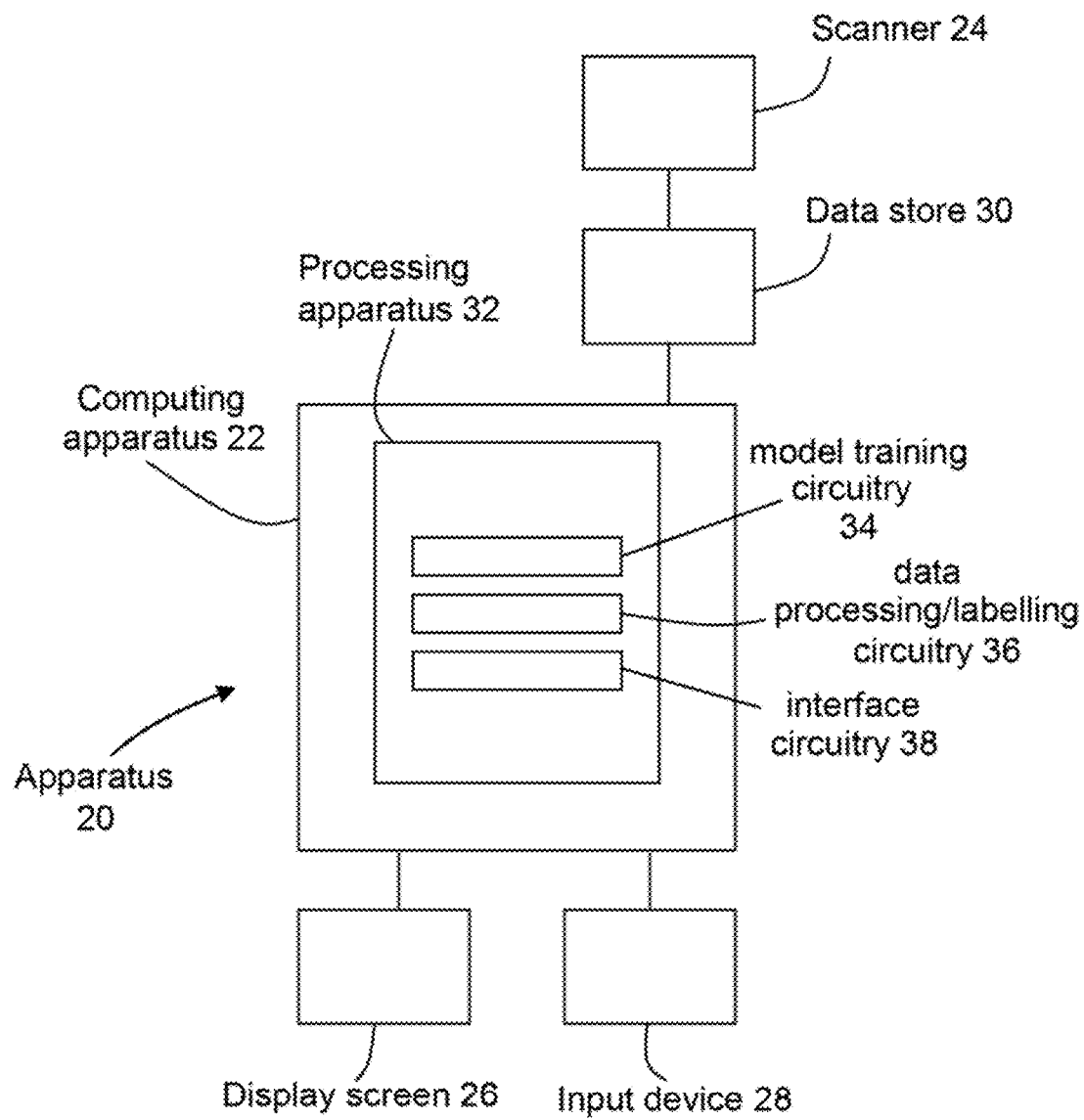
FIG. 1 is a schematic illustration of an apparatus in accordance with an embodiment.

A data processing apparatus 20 according to an embodiment is illustrated schematically in FIG. 1. In the present embodiment, the data processing apparatus 20 is configured to process medical imaging data. In other embodiments, the data processing apparatus 20 may be configured to process any other appropriate data.

The data processing apparatus 20 comprises a computing apparatus 22, which in this case is a personal computer (PC) or workstation. The computing apparatus 22 is connected to a display screen 26 or other display device, and an input device or devices 28, such as a computer keyboard and mouse.

The computing apparatus 22 is configured to obtain image data sets from a data store 30. The image data sets have been generated by processing data acquired by a scanner 24 and stored in the data store 30.

The scanner 24 is configured to generate medical imaging data, which may comprise two-, three- or four-dimensional data in any imaging modality. For example, the scanner 24 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 22 may receive medical image data and/or style data and/or feature data from one or more further data stores (not shown) instead of or in addition to data store 30. For example, the computing apparatus 22 may receive medical image data from one or more remote data stores (not shown) which may form part of a Picture Archiving and Communication System (PACS) or other information system.

Computing apparatus 22 provides a processing resource for automatically or semi-automatically processing medical image data. Computing apparatus 22 comprises a processing apparatus 32. The processing apparatus 32 comprises model training circuitry 34 configured to train one or more models; data processing circuitry 36 configured to apply trained model(s) to obtain outputs and/or to obtain labels, segmentations or any other desired processing outcomes, for example for output to a user or for providing to the model training circuitry 34 for further model training processes; and interface circuitry 38 configured to obtain user or other inputs and/or to output results of the data processing.

In the present embodiment, the circuitries 34, 36, 38 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 20 of FIG. 1 is configured to perform methods as illustrated and/or described in the following.

The generator, noise injection network, and components used to extract and subsequently combine content and style factors in embodiments described below can be provided by the data processing circuitry 36 in the embodiment of FIG. 1. The classifier and discriminator components in embodiments described below can be provided by the model training circuitry 34 in the embodiment of FIG. 1.

It is a feature of embodiments that content (e.g. anatomical or pathological) factors from different patients or other subjects can be used to synthesise realistic new images with hybrid characteristics. A disentanglement process can be applied to medical image data to obtain image feature data sets, for example content factors, and style data, for example style factors. The image feature data sets, also referred to as feature data, may encode, comprise or otherwise represent different anatomical features (for example, heart, brain or any other anatomical features of interest) or pathologies of interest. The style data may represent aspects of appearance of the image(s), for example appearance features associated to a particular imaging modality (e.g. MR imaging sequence). The feature data may correspond to at least one spatial region of interest in an area or volume represented by the image data.

The style data can be associated with a selected imaging modality and the generating of the synthesized image data is such that the synthesized image data represents an image that has an appearance consistent with being obtained using the selected imaging modality. The selected imaging modality may be the same as an imaging modality associated with, or used to obtain, the image data, but can be different to imaging modality(ies) associated with, or used to obtain, the image data. The style data can, for example, be representative of at least one a colour scheme, shading scheme, contrast range, resolution or other image property. In some embodiments, style data may be sampled from a Gaussian or other distribution.

In some embodiments the content factors are representations obtained from a tensor and/or spatial latent space and the style factors are representations obtained from a vector latent space.

In some embodiments, noise is also added, for example to at least part of one or more of the image feature data sets, for example content factors, and/or to regions represented by those image feature data sets. For example, noise data may be added at and/or around the location of a feature of an image that is replaced in the synthesized image.

Figure 2:
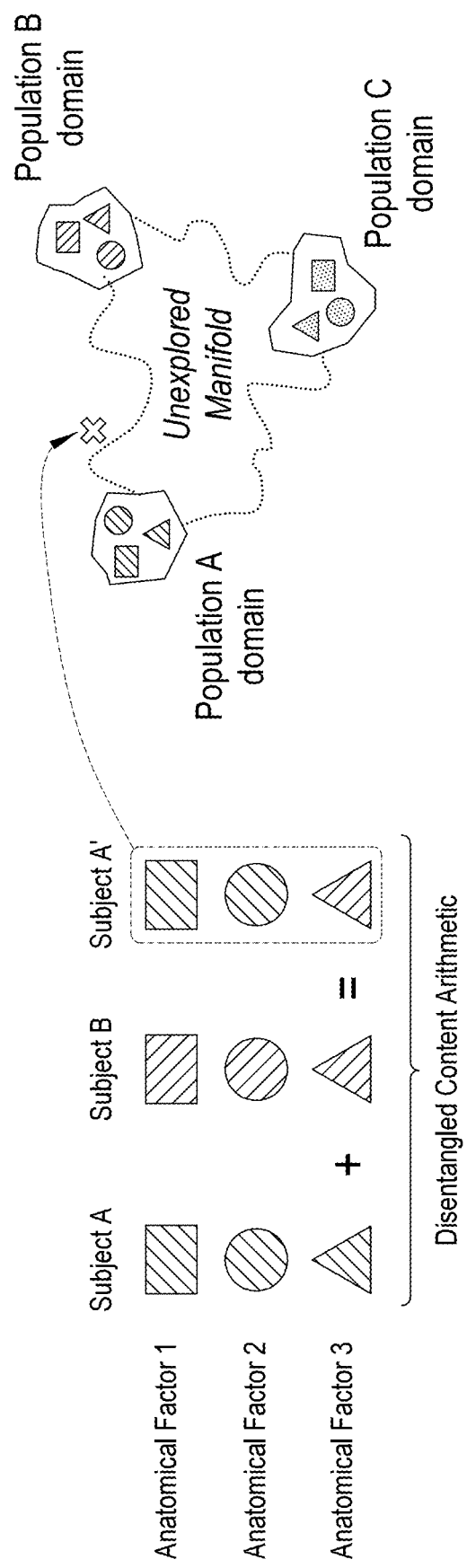
FIG. 2 is a schematic illustration of a disentangled content arithmetic process according to an embodiment.

A simplified example of synthesis of image data with hybrid characteristics according to an embodiment is illustrated schematically in FIG. 2, in which anatomical features present in image data for subject A and subject B are represented by rectangles, circles and triangles. Processes according to embodiments can be used to produce synthesized image data with hybrid characteristics that include anatomical features from the image data for subject A and the image data for subject B, based on content and style factors. The synthesized image data with hybrid characteristics is labelled as subject A' in FIG. 2.

As also illustrated schematically in FIG. 2 the synthesized dataset can be produced such as to have characteristics that are outside domains for the measured data sets that are available (e.g. domains for populations A, B and C in FIG. 2).

Synthesized data sets generated according to embodiments can also be referred to as mixed feature data sets or hybrid datasets, for example when they take content factors or other image feature data from both first and second image data sets, for instance from at least part of a first image data set and at least part of a second image data set.

The synthesized image data can include spatial or other transformation of at least some of the first image data and/or at least some the content factors e.g. the synthesized image data can comprise more than simple superposition of an image feature onto an existing image.

The generation of hybrid datasets can be used, for example, to synthesize more balanced datasets (for example, by mixing pathological factors with different examples of otherwise normal anatomy), to produce inter-domain images (for example by mixing content factors from different populations or other domains), for inference-time applications in interactive manipulation of images (for example, to provide digital twin-type processes such as simulation of the effect of pathological processes or modelling of surgical procedures in relation to an existing image data set).

Figure 3:
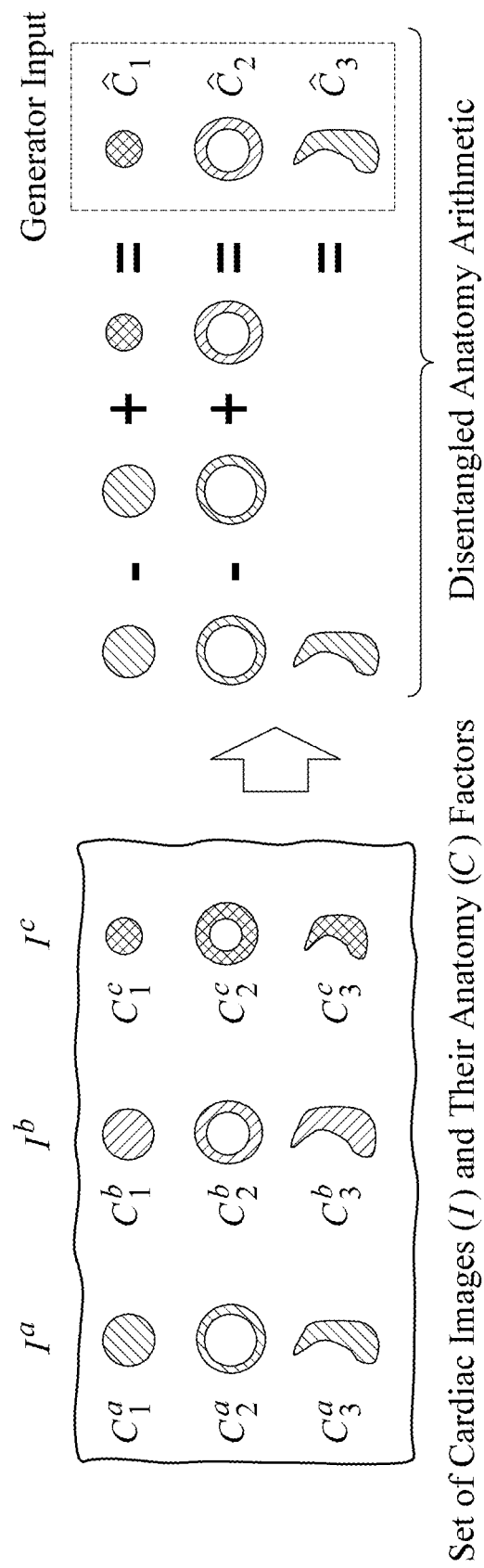
FIG. 3 is a schematic illustration of a further disentangled content arithmetic process according to an embodiment.

FIG. 3 illustrates another simplified example, in which anatomical factors are represented by rectangles, circles, triangles and diamonds. The three content factor populations $C^a_K$, $C^b_K$, $C^c_K$, (K=4 content factors per population) extracted from the $I^1$, $I^2$, $I^3$ images of the dataset $Z_{\sim\{Ia,Ib,Ic\}}$ are represented in the figure, and any factor swap between the populations can be considered to comprise a content arithmetic operation. Based on the visual example in FIG. 3, $C_2^a$ is subtracted from $C^a_K$ and then $C_2^b$ is added. Then $C_3^a$ is subtracted from the same population $C_a^K$ and $C_3^c$ is added. The result is an intermediate sample $\widetilde{C_K}$ that can be used as input to a generative model according to embodiments.

Figure 4:
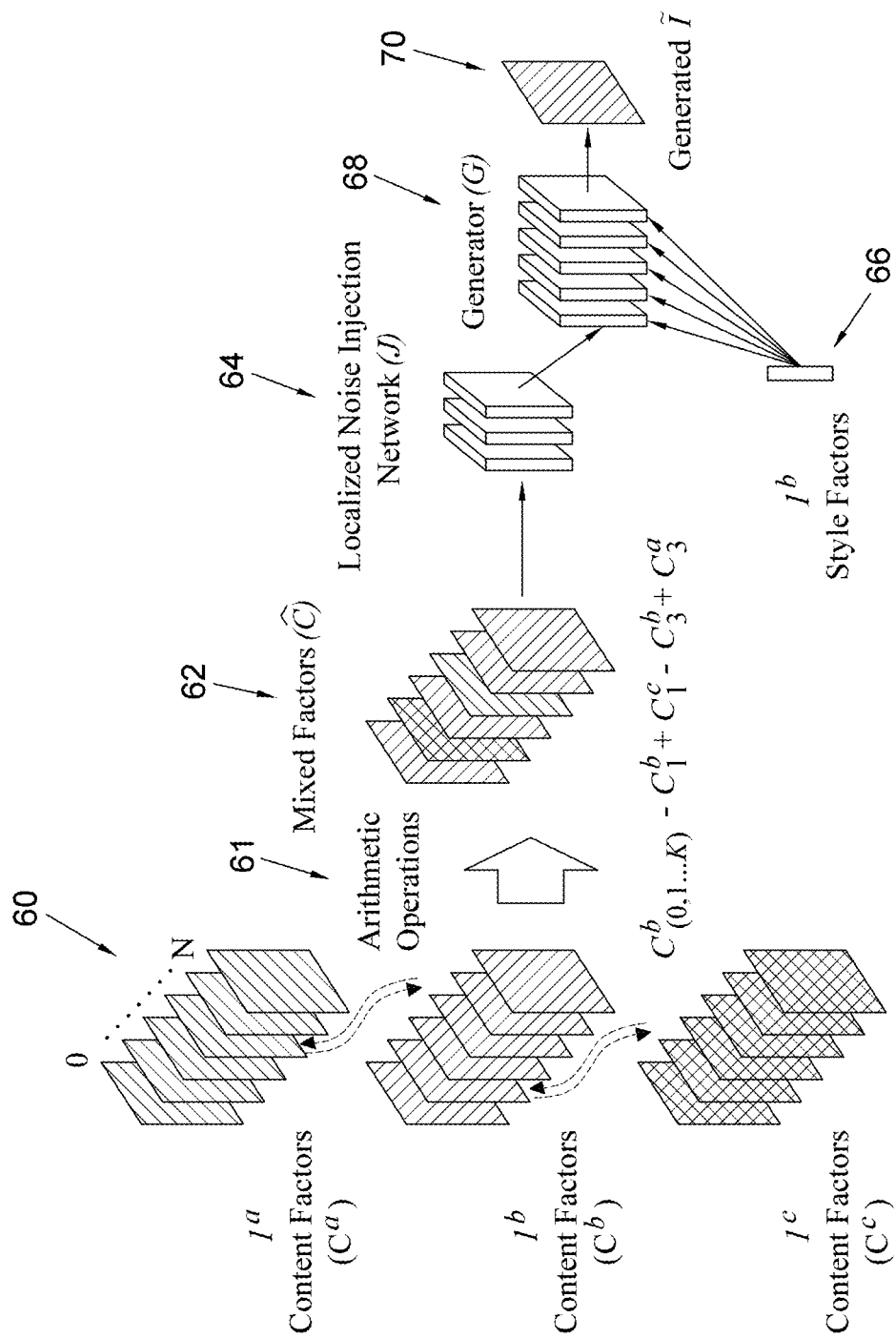
FIG. 4 illustrates a process framework provided by the apparatus of FIG. 1 according to an embodiment.

FIG. 4 illustrates in overview a process framework provided by the apparatus of FIG. 1 according to an embodiment. The process framework is shown in FIG. 4 as being applied at inference time when it is used to generate synthesized image data, for example from existing image data set(s). In embodiments the process uses trained model(s). For example the generator 69, content 60 and style factor 66 extraction components, the noise injection network 64, and the arithmetic operation processes 61 can be performed using trained models. Any suitable training methods can be used. There is further discussion below in relation to FIG. 5 of the use of adversarial training methods in some embodiments.

To generate a new, realistic image, for example of a patient, which has new content characteristics, for example a specific content-related pathology, arithmetic operations are performed on existing spatial content factors $\{C^a, C^b, C^c\}$. The arithmetic operations performed on the content factors are used to produce a mixture of content factors, also referred to as mixed content or a mixed feature data set.

A noise injection module (J) 64 is responsible for the smooth integration of the new factors in the existing content. The noise injection module 64 in this embodiment comprises a convolutional module that injects Gaussian noise patches to spatial locations where the content mixing takes place.

A generator (G) 68 in the form of neural network or other trained model is configured to receive the mixed content (e.g. mixed feature data set) and style data (e.g. a corresponding style representation) as inputs and to generate the synthesized image data set $\tilde{I}$ as an output. The generator 68 effectively fuses the mixed content factors with style factors 66. By suitable choice of content factors derived from different images, a feature from one image can be replaced by a feature from another image or source, and a realistic synthesised image including the mixture of features can be produced. Noise data in the form of at least one Gaussian noise patch is included in the mixed feature data inputted to the neural network or other trained model, as discussed.

The presented framework of FIG. 4 includes two deep neural networks: a) an SDNet model 60 used to disentangle and encode the content of an image to spatial tensors using semantic priors, e.g. for example segmentation masks of anatomical parts of interest, and b) a GAN 62 that is used to mix the content factors that correspond to different domains, generating inter-domain or other representations that are plausible based on the semantic priors. Any other suitable components, for example any suitable other trained models, may be used to obtain content factors and/or style factors, and to combine different content factors.

Figure 5:
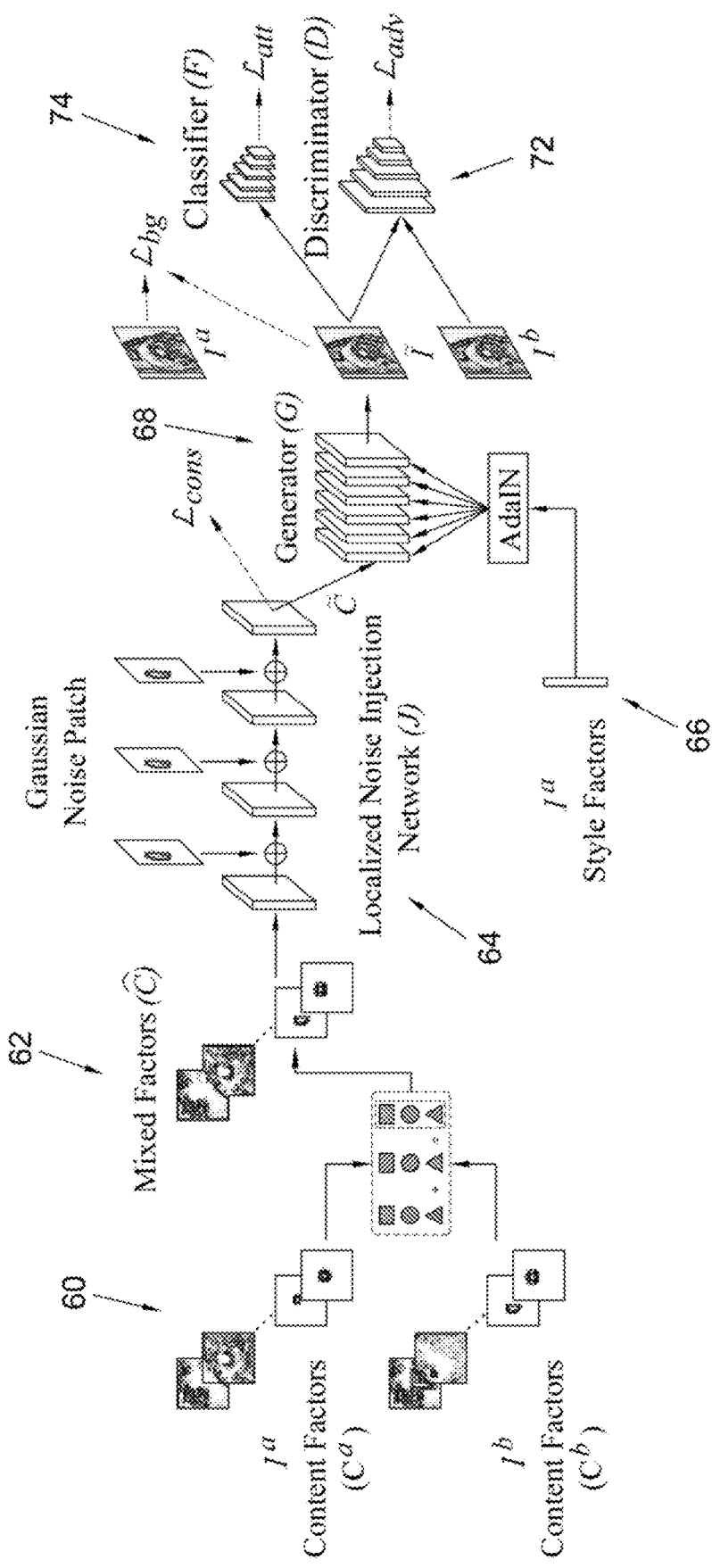
FIG. 5 illustrates the process framework in more detail.

The process framework of the embodiment of FIG. 4 is also illustrated in FIG. 5 in a training phase, which uses classifier 74 and discriminator 72 components that can be used at training time to train, for example, the generative model provided by the generator 68. The discriminator 72 can be used, for example, to decide if the generated image $\tilde{I}$ is real or not as part of the training process. For instance, the discriminator 72 can be configured to discriminate between synthesized image data and image data and/or feature data used in generating the synthesized image data, and the classifier can be used to identify anatomical features of interest, pathologies of interest or other attributes. Further description of the various components illustrated in FIGS. 4 and 5, and description of training processes for the different components, is provided below.

The synthesis framework of the embodiment operates on spatial content representations. Thus, a process is performed at stage 60 before the content mixing process to decompose the input images into content and style representations. In the present embodiments, an SDNet model is used to perform the process at stage and thereby to disentangle spatial content factor for a spatially equivariant task, e.g. semantic segmentation.

Briefly, SDNet encodes content and style using two encoders: a) a U-Net is used to encode the content of the input image into a predefined number of tensors that share the same spatial dimensions with the input, thus preserving pixel-level correspondences with it, and b) the encoder of a VAE is used to encode the style of the input image into a vector representation. The former latent representation can be used as input to a segmentation module, while also being re-entangled with the latter in a decoder that is configured to reconstruct the input.

A modified version of SDNet is used in the present embodiment. In the version used, instead of a custom binarization layer to constrain an output of a content encoder EC into [0,1] value range, a Gumbel-Softmax operation that is differentiable and produces smoother latent representations is used. Secondly, re-entangling of content and style is performed using Adaptive Instance Normalization (AdaIN) layers in different levels of granularity of the decoder. Each AdaIN layer performs the following operation:

$$AdaIN = \sigma(S_i)\frac{C_i - \mu(C_i)}{\sigma(C_i)} + \mu(S_i),$$

where each content feature map $C_i$ is first normalized separately, and then is scaled and shifted based on the style $S_i$ mean and standard deviation scalars.

A fully-supervised learning setup of the SDNet architecture is used in the present embodiment, in which a model is trained using the following loss function:

$$\mathcal{L}_{total} = \mathcal{L}_{reco} + 10 * \mathcal{L}_{seg} + 0.01 * \mathcal{L}_{KL} + \mathcal{L}_{reco}^2$$

where $\mathcal{L}_{reco}$ is the L1 distance between input and reconstructed output, $\mathcal{L}_{seg}$ is a Dice Score between the predicted and ground truth segmentation masks, while the Kullback-Leibler divergence $\mathcal{L}_{KL}$ encourages the style latent distribution to be Gaussian. Finally, $\mathcal{L}_{reco}^z$ denotes the latent reconstruction loss realized as the L1 distance between a randomly sampled style code $z \in S$ and the respective code after decoding z and re-encoding the generated image.

During inference, for example as illustrated schematically in FIG. 4, the disentangled content and style factors are extracted as separate representations using only the trained encoders EC and ES. The number of content factors depends on the available semantic priors.

As shown schematically in FIG. 5, mixed content $\widehat{C_K}$ factors are received as input and a new representation is produced. Stochastic details can be generated by introducing by the noise injection network 64 uncorrelated noise patches at the spatial location of the new factors. Output of the noise injection network 64 is used as input to the generator 68, which is responsible for the re-entanglement of the content with the style, and for the generation of the new image ($\tilde{I}$) 70.

The new image 70 in this example is in the form of a mixed image feature data set, in which at least one feature from a first image feature data set $I^a$ is replaced by a corresponding replacement feature from a second image feature data set $I^b$, with the replacement being achieved by selecting of appropriate content factors obtained from the image data sets, and then providing the content factors to the generator 68 to generate the mixed image feature data set. Noise is added at the location of the replacement feature.

In the present embodiment, the generator 68 comprises three CONV layers, each followed by a Rectified Linear Unit (ReLU) non-linearity, and 1 CONV layer followed by a hyperbolic tangent activation function. The first CONV layer receives $\widehat{C_K}$ as input, and after each CONV-ReLU block there is an AdaIN layer that scales and shifts activations based on the input style factors. In this embodiment, as $\widehat{C_K}$ has the same dimensions as I and $\tilde{I}$, there is no need for any upsampling operation.

The discriminator 72 in this embodiment may adopt the structure of an LSGAN discriminator using a Leaky ReLU negative slope set at 0.21, which leads to smaller adversarial loss oscillation during training.

Finally, the classifier 74 uses a VGG-like model to classify attributes of $\tilde{I}$. In the present embodiment, the classifier 74 comprises seven CONV-BN-ReLU blocks and three fully-connected (FC) layers. Five max pooling layers are used to downsample image features, while the last FC layer dimensionality depends on the type of the considered dataset. In the present embodiment, in case of medical data if the attribute is realized as content-related pathology that rules out a healthy class or any other content-related pathology, the last FC layer has dimension equal to the number of attributes that exist in the dataset, and is followed by a Softmax function. In traditional vision cases, existence of an attribute does not rule out the existence of other attributes, (for example, earrings and sunglasses can co-exist on an image depicting a human face). In the present embodiment the last FC layer has only one neuron followed by a Sigmoid function. For the latter, as many classifier models may be used as the number of attributes that are present in the dataset.

The classifier 74 may initially be trained as a standalone classification network on original data, and may then be used as an attribute predictor during training of a generative model of the generator 68.

In the present embodiment, the generative model of the generator 68 is trained using adversarial loss, while semantic and attribute priors are exploited as further regularization, forcing partial content background consistency and attribute presence. The total loss used to compute the respective gradients is defined as:

$$\mathcal{L}_{total} = \mathcal{L}_{adv} + \mathcal{L}_{att} + \lambda_1(\mathcal{L}_{cons} + \mathcal{L}_{bg})$$

where $\lambda_1=10$ is a weighting hyperparameter for the consistency losses. The adversarial loss, as well as the regularization functions are discussed further below.

In order to train the generator 68 in the present embodiment least squares adversarial loss is minimised, which can lead to more stable training process and higher quality image generation compared to known GAN loss. The adversarial loss in this embodiment can be defined as:

$$\mathcal{L}_{adv} = \mathcal{L}_\mathcal{D} + \mathcal{L}_\mathcal{G},$$

$$\mathcal{L}_\mathcal{D} = \tfrac{1}{2}\mathbb{E}_{P \sim p(z)}[(\mathcal{D}(M \cdot I') - 1)^2] + \tfrac{1}{2}\mathbb{E}_{C \sim p(C_2)}[\mathcal{D}(M \cdot \mathcal{G}(\hat{C})))^2],$$

$$\mathcal{L}_\mathcal{G} = \tfrac{1}{2}\mathbb{E}_{C \sim p(C_2)}[(\mathcal{D}\,\mathcal{G}(\hat{C})) - 1)^2],$$

where I' is the image that contributes only the content factor(s) C' that are used to form $\widehat{C_K}$. M denotes the binary mask produced by collapsing all content factors that contain semantic information into a 2D image. Note that with M(j)=0 for each pixel location j that is not related with any semantic prior.

With regard to content background consistency, $\mathcal{L}_{cons}$ forces the maximization of the pixel-wise similarity between input $\widehat{C_K}$ and the noise injection module output $\widetilde{C_K}$. To perform correct pixel-wise supervised learning between the two representations, the region dissimilarity due to content mixing is masked out. Thus, considering the blurred mask produced during the noise patch generation, denoted as Φ(j) with Φ(j)=0 for each pixel location j that is not part of the content mixing, $\mathcal{L}_{cons}$ is defined as:

$$\mathcal{L}_{cons} = \frac{1}{N}\Sigma_j(1 - \Phi(j))\|\hat{C}(j) - \tilde{C}(j)\|_1$$

where $\hat{C}(j)$ and $\tilde{C}(j)$ are the mixed and noisy content representations, respectively.

With regard to image background consistency, $\mathcal{L}_{bg}$ operates in the same fashion as $\mathcal{L}_{cons}$ but at image level (thus using M instead of N).

With regard to attribute classification, the adversarial loss can be regularised by exploiting the attribute information priors. In particular, considering that it is known that the k content factor is added to the mixed representation, it is expected to be able to recognize the corresponding attribute in the generated image $\tilde{I}$. This prior knowledge can be enforced by minimizing the cross entropy defined as:

$$\mathcal{L}_{att} = -\Sigma_{i=1}^{\Omega} y_i \log(p(x_i)),$$

where $y_i$ and $p(x_i)$ are the ground truth and predicted attribute label, while Ω denotes the number of attributes.

In the example shown in FIG. 5, the discriminator 72 receives I as fake input and $I^b$ as true input. $I^b$ includes desired attributes (e.g. $C^b$ factors are added to the overall $C^a$ content space). The classifier receives $\tilde{I}$ and determines if the desired pathology (or attribute) is included or not.

Any suitable training methods may be used in alternative embodiments. For example the training may comprise minimising adversarial loss and/or incentivising consistency of background image and/or incentivising correct classification of anatomical features of interest, pathologies of interest or other attributes, and/or incentivising consistency of background content prior and after noise injection, using any suitable methods.

Returning to consideration of the injection of noise in the present embodiment, as already noted the generative model is enhanced with a localized noise injection network that creates stochasticity in the spatial location where the content mixing takes place. Thus, noise data can be added to the mixed image feature data set. The stochasticity enables the smoother blending of content factors and leads to higher quality image synthesis. The structured Gaussian noise patch is created at the known spatial location of the removed content factor.

In more detail, the localised noise injection network (J) 64 is configured to introduce stochasticity in certain spatial location of the input content factors. It is possible that the generator 68 may consume some of its capacity to create stochastic variation in the high-frequency details, so in the present embodiment a simple fully-convolutional network is used as the localised noise injection network 64, which is able to create stochastic variation on specific spatial locations and forces the generator 68 to consume its full capacity in content-style re-entanglement.

As shown schematically in FIG. 5, the noise injection network 64 comprises four CONV layers. Each of the first three layers is followed by a ReLU non-linearity and a residual connection with the generated noise patch. The last CONV layer is followed by a Gumbel Soft-max operator that thresholds $\widetilde{c_K}$ to [0,1] range.

Figure 6:
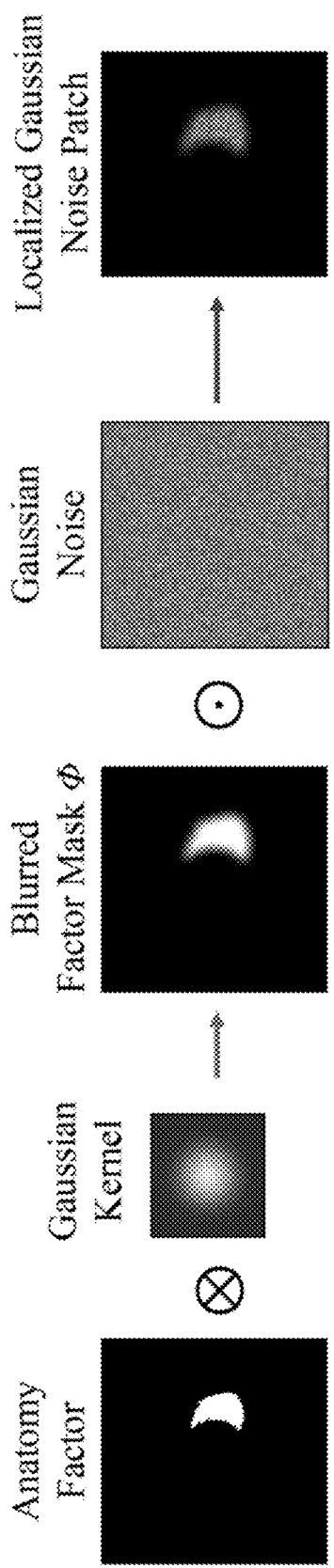
FIG. 6 is a schematic representation of a localised Gaussian noise patch implementation according to an embodiment.

The generation of the Gaussian noise patch is illustrated schematically in FIG. 6, which shows a content factor being convolved or otherwise combined with a Gaussian kernel or other distribution to produce a blurred factor mask, that is then combined with Gaussian or other noise to produce a localized noise patch.

Since it is known a priori which content factor is being removed, as well as its spatial location, it is aimed to introduce some stochastic variation in the spatial location of the hole or other region that will be filled by the new factor. Thus, assuming that factor $C_k$, where $k \in K$, is being removed from the input representation, $C_k$ is used as semantic prior that helps to create the desired noise patch. First, the $C_k$ 2D representation is blurred using Gaussian kernels of 10×10 pixel resolution, in order to extend the stochasticity to the surrounding content. Since $C_k$ has values in [0,1] range, it can be seen as a binary mask. Thus, Gaussian noise can be sampled in a 2D representation and multiplied in an element-wise fashion with the binary mask. The last operation produces a Gaussian noise patch at the spatial location of the removed factor.

The noise injection network can operate in convolutional manner to convolve channels of content factors with injected noise. As mentioned, content factors are extracted using a network or other trained model, for example SDNet, then content can be chosen to include in image data set(s) and the corresponding content factors can be combined with style factors by the generator 68. Any of the components shown in FIG. 4 or FIG. 5 can be implemented as trained models according to embodiments, and any suitable training process can be used, for example any suitable adversarial training process.

Embodiments can be used for synthesis of image data for various purposes. For instance, the synthesized image data can be used as training data. The synthesized image data can be used as training data in a set of training data and a machine learning model can be trained using the set of training data. Alternatively or additionally, a plurality of synthesized image data sets may be generated, and the generating of the synthesized image data sets comprises adding at least one pathology to image data derived from normal, non-pathological data sets thereby to provide additional pathological examples in a set of training data sets. The synthesized image data set can, for example, represent a selected patient or other subject and represents a modified version of medical image data, with the first medical image data having been obtained by scanning the patient or other subject.

In one example, a quantitative evaluation of performance of the generative model according to an embodiment applied to data from the Automatic Cardiac Diagnosis Challenge (ACDC) dataset produced a Frechet inception distance (FID) score of 21.5 if no noise injection was used, and 17.2 if noise injection was used.

Figure 7:
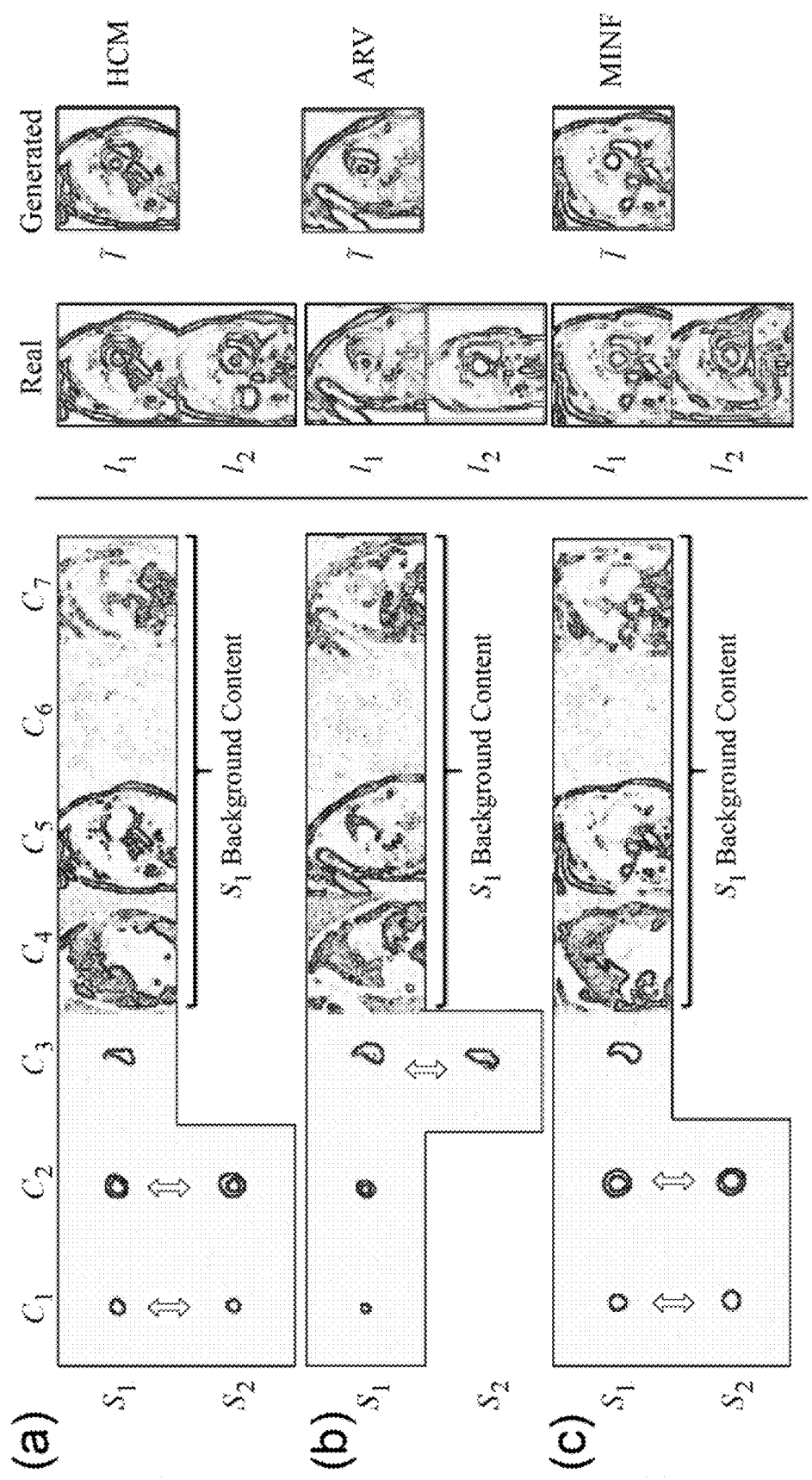
FIGS. 7 to 10 show various results of using a generative model of an embodiment in respect of medical image data.

FIGS. 7 to 10 show results of synthesizing image based on content factors, also referred to as image feature data, and style data, according to embodiments. Various labels are used in relation to the results, according to which NOR indicates no pathology, MINF indicates myocardial infarction, DCM indicates dilated cardiomyopathy, HCM indicates hypertrophic cardiomyopathy and RV indicates abnormal right ventricle FIG. 7 shows three indicative examples of performing arithmetic operations with disentangled anatomy factors. The best-performing variant (J, G,D, and F) of the proposed model is used to generate new MR images with specific pathology: a) from NOR to HCM, b) from NOR to ARV, and c) from MINF to MINF. S and C denote subjects and disentangled content factors, respectively. Arrows indicate factor swapping, while factors that do not contain any information are omitted.

Figure 8:
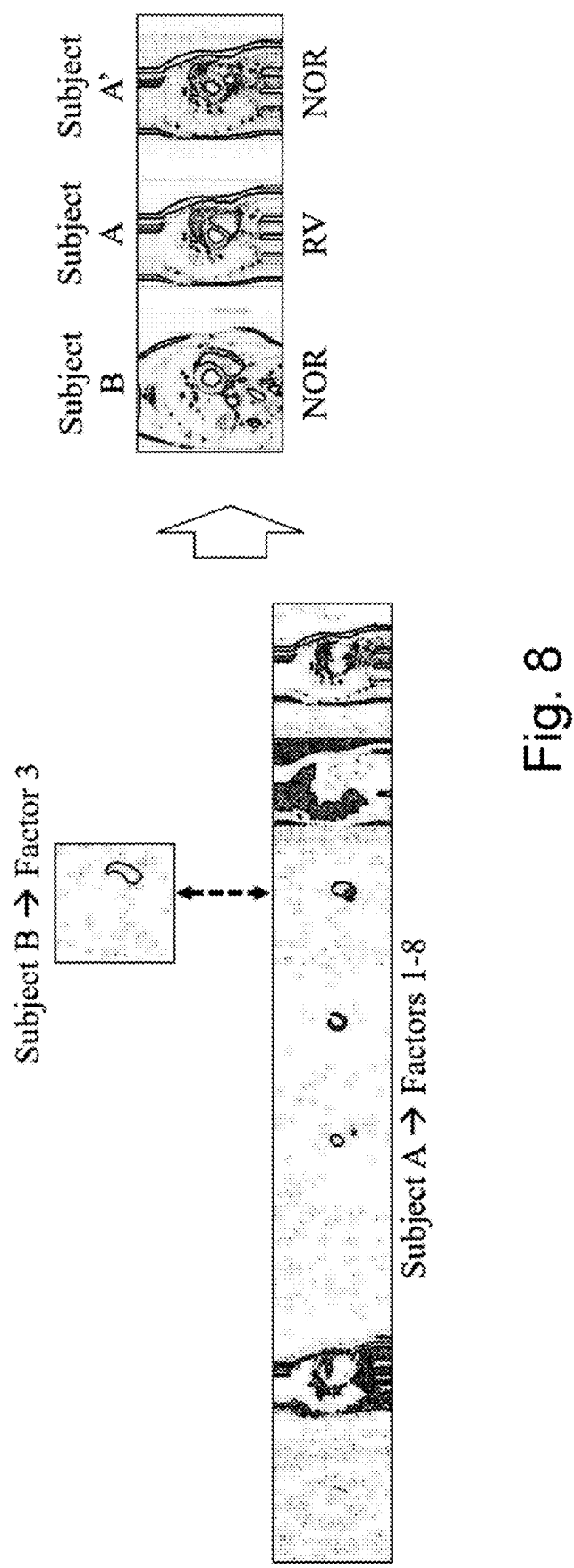

FIG. 8 shows results obtained using a generative model with no noise added. Content factors 1 to 8 obtained from a first image, image of subject A, and content factor 3 obtained from a second image, image of subject B, are shown. Subject B is a subject with no pathology (NOR) and subject A is a subject with an abnormal right ventricle (RV). The image of subject A and the image of subject B are shown. An image of subject A' is also shown, which is obtained by replacing content factor 3 of subject A with content factor 3 of subject B, thus producing an image representing subject A as they would appear if instead of having an abnormal right ventricle they had normal pathology (similar to that of subject B).

Figure 9:
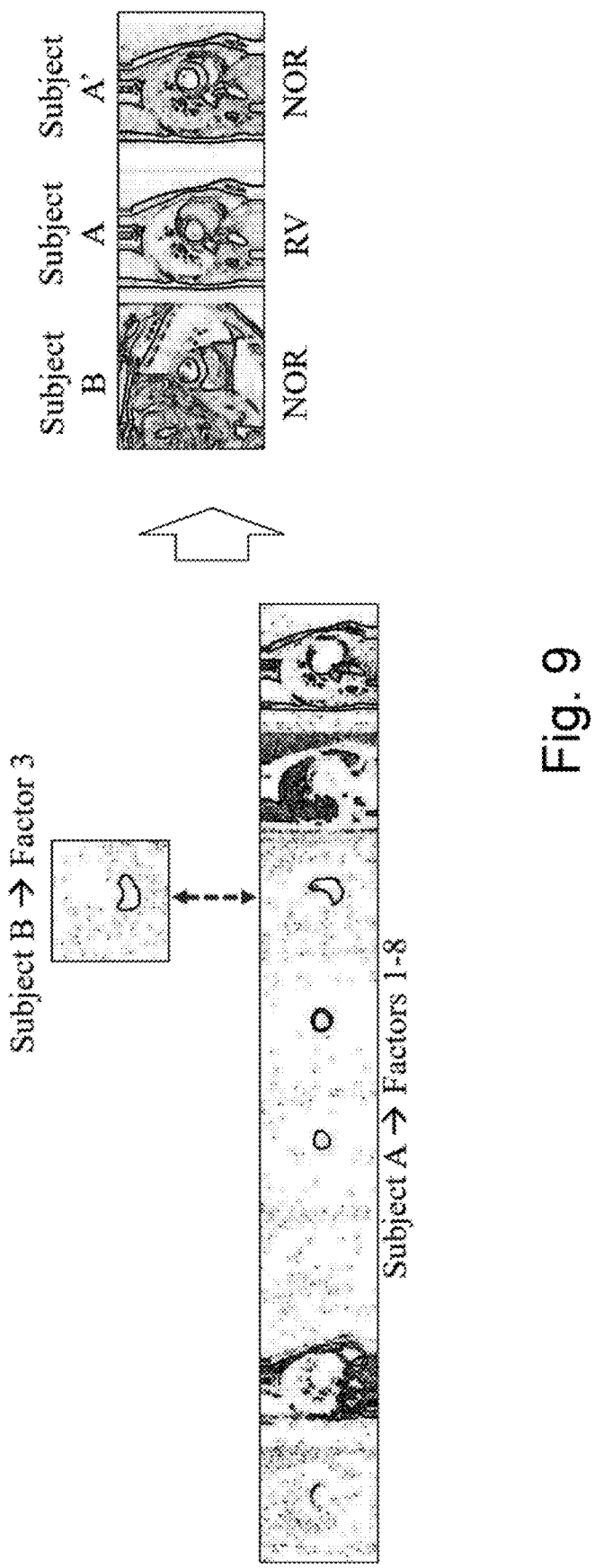

FIG. 9 shows the same results as those of FIG. 8, with content factor 3 from subject B replacing content factor 3 for subject A to produce a modified image of subject A with an abnormal right ventricle (RV) but in this example noise is also added, for example a Gaussian noise patch, as part of the process of generating image A'.

Figure 10:
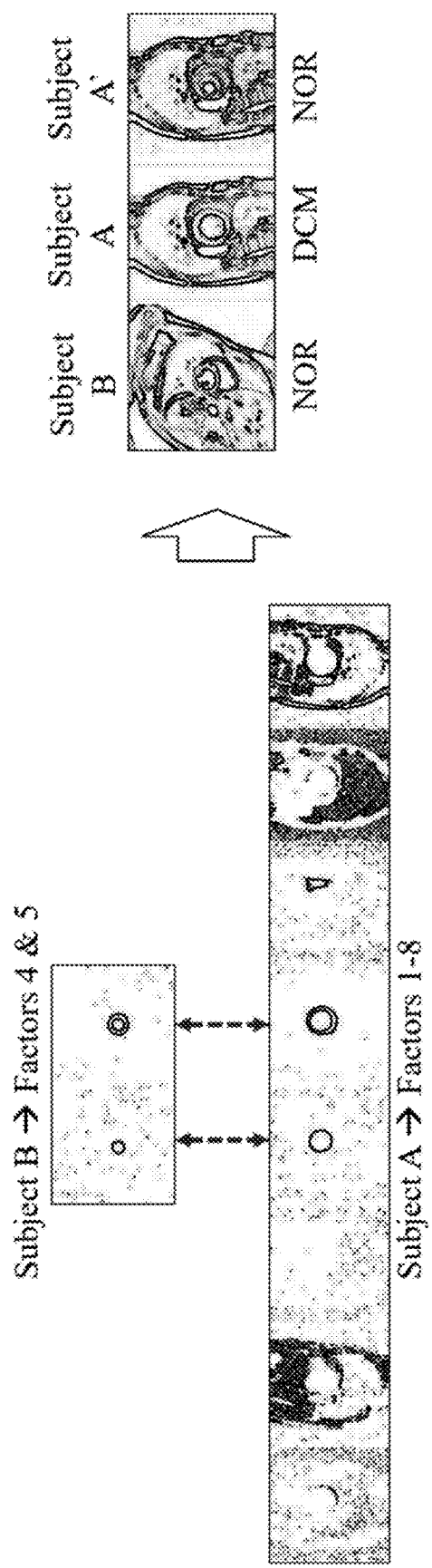

FIG. 10 shows the results of a similar process to that illustrated by the results of FIGS. 8 and 9, but in this case subject B has normal pathology and subject A has dilated cardiomyopathy (DCM) and content factors 4 and 5 of subject B are used to replace content factors 4 and 5 of subject A thereby producing a modified image A' of subject A that has normal pathology (similar to that of subject B).

Figure 11:
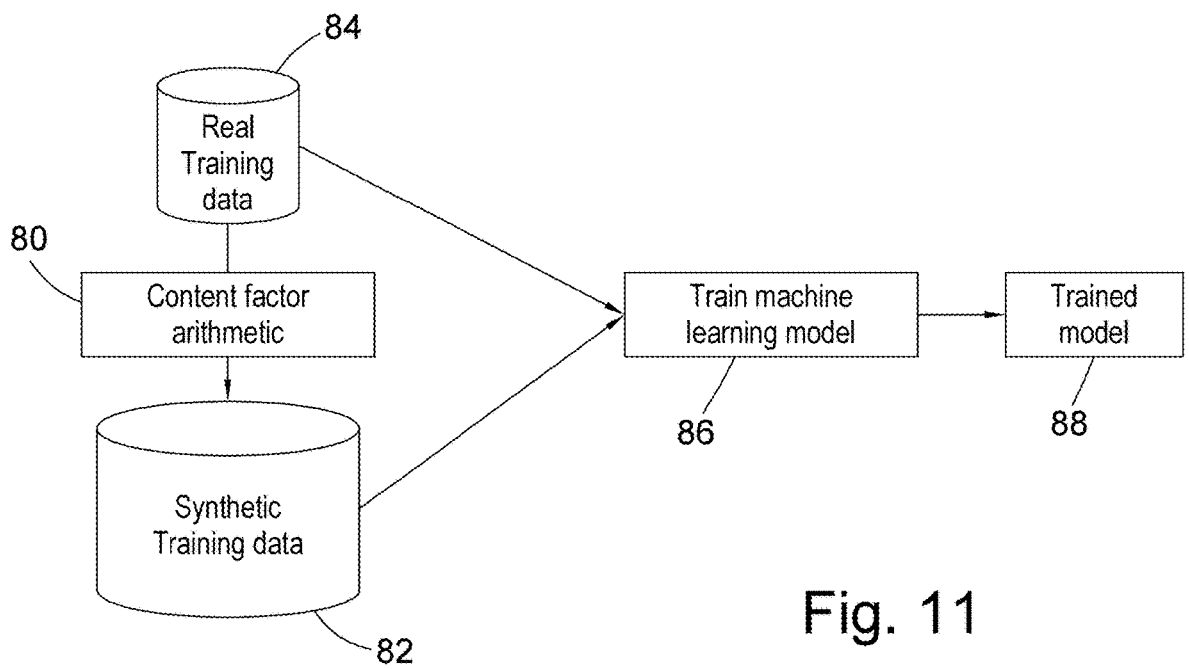
FIG. 11 is an illustration in overview of a process flow according to an embodiment for augmentation of training data.
Figure 12:
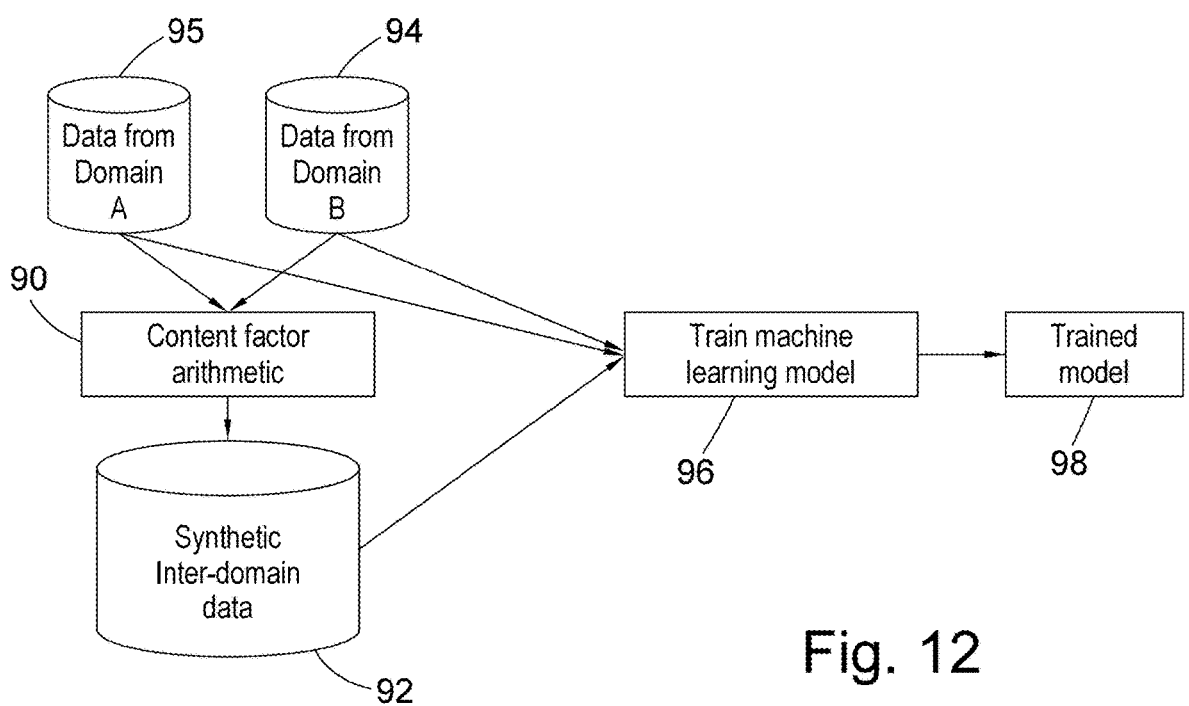
FIG. 12 is an illustration in overview of a process flow according to an embodiment for inter-domain synthesis of data.
Figure 13:
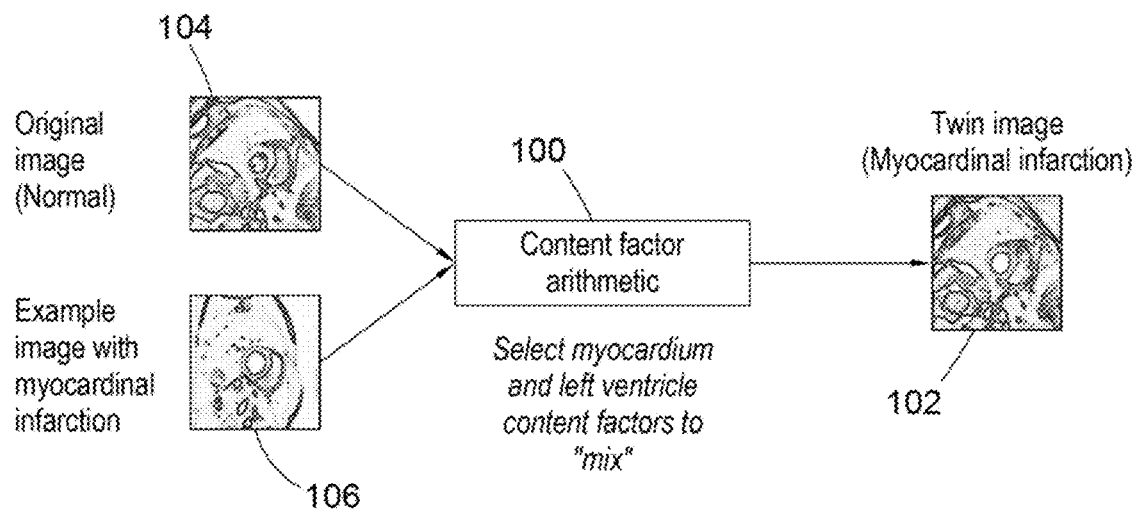
FIG. 13 an illustration in overview of a process flow according to an embodiment for synthesis of data to show the data with or without a pathology, outcome of a procedure or other feature.

Further particular examples of processes for generation of synthesized data sets according to embodiments are illustrated schematically in FIGS. 11 to 13.

As illustrated schematically in FIG. 11, processes 80 according to embodiments can be used to generate synthetic data sets 82 (also referred to as synthesized data sets) from real training data sets 84, for example image data sets obtained by performing scans or other measurements on patients or other subject, for instance using any desired imaging modality. The content factor arithmetic process 80 may be a process as described in relation to the embodiment of FIGS. 4 and 5. Both the real training data sets 84 and the synthetic data sets 82 can then be used in a training process 86 to train a machine learning model in order to produce a trained model 88. Any suitable training process and type of machine learning model can be used. The synthesizing of the data sets 82 can be used to ensure that the model is trained on a collection of data sets that have similar properties to a population that the model is intended to be used on. For example, it can be ensured that pathologies that may not be present, or present only rarely, in the real training data can be represented in the synthesized data. There are various rare diseases, for example diseases affecting fewer than one in 2,000 people, and embodiments can be used, for example, to ensure that collections of training data include data sets representing such rare diseases by generating synthetic data using content factors representing such rare diseases.

In some embodiments, it can be ensured the rate of occurrence of particular pathologies in the combination of real and synthesized data is similar to the expected rate of occurrence in a real population. The synthesizing of data may be such as to provide additional variations in size, shape or position of particular anatomical features to supplement those in the real training data. The synthesizing of data sets also ensures that the model can be training on larger numbers of data sets than would be the case if the model was trained only on the real data sets. The synthetic data can, for example, provide increased diversity in the data that is used to train the model.

As illustrated schematically in FIG. 12, processes 90 according to embodiments can also be used to generate synthetic inter-domain data 92 from data obtained from different domains, for example data 94 from domain A and data 95 from domain B (e.g. population A and population B). For example, if there is more data available in domain A than domain B, then synthetic data for domain B can be generated, for example, by modifying data sets from domain B to include content factor(s) obtained from data of domain A.

Alternatively or additionally synthetic data can be generated that has characteristics between, or otherwise different from, those typical of domains A and B. For instance, in a simplified example, if a particular anatomical feature or pathology has a typical range of sizes in domain A, a different range of sizes in domain B, then for example the synthetic data could be generated to have ranges of sizes between those typical of domains A and B.

Both the data 94, 95 from the different domains and the synthetic inter-domain data 92 can then be used in a training process 96 to train a machine learning model in order to produce a trained model 98. Any suitable training process and type of machine learning model can be used. As data from different populations can have different characteristics (e.g. anatomical shape, size) and it may be desirable for trained models to perform well across multiple or all populations or other domains, including those populations or other domains for which there was no/little training data, the use of synthetic inter-domain data can be used to improve the training of the model. The synthetic data can, for example, provide increased diversity in the data that is used to train the model.

Turning to FIG. 13, as illustrated schematically a process 100 according to embodiments can also be used to generate synthetic data 102 from data 104 for a patient or other subject of interest, by including content factor(s) obtained from other data 106, e.g. data obtained for another subject or other example image data. The content factor arithmetic process 100 may be a process as described in relation to the embodiment of FIGS. 4 and 5. The original data 104 and the synthetic data 102 representing the same subject may be referred to as twin data, and may for example be used to obtain images of the same subject with or without a selected pathology and/or with or without a procedure being performed on the subject. This can enable, for instance, the modelling of specific variation for an individual patient e.g. how a patient might progress with a particular pathology, or how they might respond to a particular treatment (e.g. surgical procedure). This approach may be used to enable clinicians to manipulate images at inference time e.g. to visualise how a patient might appear with (or without) a particular pathological or anatomical feature, or following a surgical procedure, or to show a possible change in an existing pathology. In the particular example show in FIG. 13, the original image data 104 of a patient without significant pathology is modified to include a myocardial infarction, with the representation of the myocardial infarction in the synthetic data 102 being obtained using a content factor obtained from the example image data 106. The myocardial infarction content factor from data set 106 is combined with content factors obtained from original image data 104.

As discussed, embodiments can be used for a variety of purposes. For example, embodiments may be used to improve a medical image analysis algorithm by generating extra training data.

In further specific examples, data augmentation by embodiments may be used in connection with anatomy segmentation e.g. cardiac regions or any other regions in medical scans. Creating of new realistic medical imaging data can provide extra examples to increase the accuracy of deep learning models in semantic segmentation. The new data can, for example, be used either with no annotation for semi-supervised deep learning, and can be annotated, for instance by experts, to enhance fully supervised deep learning models In other specific examples, data augmentation can be used in relation to pathology segmentation/classification, e.g. tumour or left ventricular hypertrophy or any other suitable pathology in medical scans. Creating new realistic medical imaging data with specified (rare) pathologies can help to build more balanced datasets that can improve deep learning models in pathology classification. In relation to classification, a pathology label of a sample may also be known, so synthesized (image-level) labelled samples can be obtained that can be used for supervised deep learning.

Embodiments have been described that use medical imaging data obtained according to particular imaging modalities and/or that generate synthesized data that appears to have been obtained according to particular imaging modalities. Any suitable imaging modalities may be used, for example at least one of CT, MR, ultrasound, X-ray, PET or SPECT.

Alternative embodiments, or extensions of existing embodiments, can use an interpolate function between content factors (rather than simple mixing) in order to produce more precise synthetic images which, for example, represent a degree of variation between 2 images. This may provide for more complex and/or weighted arithmetic operations with different images contributing in different proportions or with different weights to the synthesized image (e.g. 0.1A+ 0.9B where A and B are input images).

Alternative embodiments, or extensions of existing embodiments, can be used to leverage the stronger priors of a 3D anatomy representation and enforce spatial consistency between different content factor slices.

Alternative embodiments, or extensions of existing embodiments, can be used to combine disentangled spatial content arithmetic with style mixing. Certain embodiment mix spatial content factors and fuse them with predefined style representations (e.g. extracted from SDNet). In alternative embodiments, style factors are determined from other regions of the style latent space, and e.g. style factors may represent image appearances between and/or different from those obtained from particular imaging modalities, or from specific scanners.

Alternative embodiments, or extensions of existing embodiments, can be used to invert the disentangled content arithmetic logic to achieve better disentanglement e.g. exploit content mixing results during training of SDNet or other model to force the model to learn to separate the different factors without softmax-like operations.

Certain embodiments provide apparatus for generating new spatial content by combining spatial representations of spatial content from different images of a similar scene. The spatial content factors may be derived from a content-style disentanglement model. The combining may be achieved using a noise injection network. The combination may be achieved using a spatial transformer network. The combination may be achieved using a compositional architecture. The combined representation(s) may be used to generate new imaging data. The generation of imaging data may be aided by style (appearance) factors derived from a content-style disentanglement model. Style factors may be combined with generated spatial content to approximate new distributions from different domains.

Certain embodiments provide apparatus for controllable generation of spatial content by combining spatial representations of spatial content from different images of a similar scene. Spatial content factors may be linearly and/or non-linearly interpolated to combine the spatial representations in a controllable manner.

Certain embodiments provide apparatus for disentangling content and style representations by combining spatial representations of spatial content from different images of a similar scene.

Certain embodiments provide a method for generating new medical image data sets, comprising: determining content factors and style factors from a plurality of existing medical image data sets; and using a generative model to generate new medical image data set(s) using a combination of the determined content and style factors.

The method may comprise generating the new medical image data sets as training data sets for training a machine learning model. The generating of new medical image data sets may comprise adding pathologies to image data derived from normal, non-pathological data sets thereby, for example, to provide additional pathological examples in a set of training data sets.

The generating of new medical image data sets may comprise obtaining a more balanced set of training data sets, and/or obtaining at least some training data sets that each mix content factors from a plurality of populations or domains. The new medical image data set generated by the generative model may comprise a derived medical image data set representing a selected patient and may be derived based on a medical image data set previously obtained by scanning the patient.

The content factors and/or style factors may be obtained using a content-style disentanglement model. The content and/or style factors may be disentangled using a combination of image data sets providing spatial representations of spatial content from different images of a similar scene or subject.

Using the generative model may include inserting noise across content factors at selected location(s) based on semantic information derived from the plurality of existing data sets. The generating of new data sets using a combination of the determined content and style factors may include using a noise injection network and/or a spatial registration network and/or a compositional architecture.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image data processing apparatus comprising:
processing circuitry configured to:
receive first medical image data;
receive second medical image data and/or stored image feature data;
extract a first image feature data set from the first medical image data;
extract a second image feature data set from the second medical image data and/or from the stored image feature data;
obtain style data;
extract a part of the first image feature data set and a part of the second image feature data set;
synthesize the part of the first image feature data set and the part of the second image feature data set to obtain a synthesized image data set; and
input the synthesized image data set and the style data to an artificial intelligence (AI) network to generate synthesized image data, wherein
the synthesized image data comprises a hybrid image that includes at least one anatomical feature from the first feature image data and at least one anatomical feature from the second feature image data, and
the synthesized image data set is obtained by performing an arithmetic operation using two or more of content factors Ca, Cb, and Cc, the two or more of content factors Ca, Cb, and Cc being included in the first image feature data set and/or the second image feature data set.

2. The image data processing apparatus according to claim 1, wherein the processing circuitry is configured to perform a disentanglement process with respect to the first medical image data to extract the first image feature data set and/or to perform a disentanglement process with respect to the second medical image data to extract the second image feature data set.

3. The image data processing apparatus according to claim 2, wherein the disentanglement process also comprises generating the style data.

4. The image data processing apparatus according to claim 1, wherein at least one of a) or b):

a) at least one content factor of the two or more of content factors Ca, Cb, and Cc is representative of at least one anatomical feature or pathology; or
b) the first image feature data set and/or the second image feature data set comprises output of a trained model.

5. The image data processing apparatus according to claim 1, wherein the style data is determined based on at least one of the first medical image data or the second medical image data and/or is sampled from a Gaussian or other distribution.

6. The image data processing apparatus according to claim 5, wherein the synthesized image data is generated using a trained model that is trained by minimising adversarial loss and/or by incentivising consistency of background image and/or by incentivising correct classification of anatomical features of interest, pathologies of interest or other attributes, and/or by incentivising consistency of background content prior and after a noise injection.

7. The image data processing apparatus according to claim 1, wherein the processing circuitry is configured to generate a mixed feature data set based on at least part of the first image feature data set and at least part of the second image feature data set.

8. The image data processing apparatus according to claim 7, wherein the processing circuitry is further configured to:
generate the mixed feature data set by replacing at least one feature included in the first image feature data set with a corresponding feature from the second image feature data set.

9. The image data processing apparatus according to claim 7, wherein the processing circuitry is further configured to:
generate the synthesized image data using a trained model, wherein the trained model is trained to generate the synthesized image data based on the mixed feature data set and the style data.

10. The image data processing apparatus according to claim 9, wherein the trained model comprises a neural network that is configured to receive the mixed feature data set and the style data as inputs and to provide the synthesized image data as an output.

11. The image data processing apparatus according to claim 7, wherein the processing circuitry is further configured to add noise data to the mixed feature data set.

12. The image data processing apparatus according to claim 11, wherein the processing circuitry is configured to generate the mixed feature data by replacing at least one feature included in the first image feature data set with a corresponding replacement feature from the second image feature data set, and the adding of noise data comprises adding the noise at a location of the replacement feature.

13. The image data processing apparatus of claim 1, wherein the synthesized image data comprises spatial or other transformation of at least some of the first medical image data and/or at least some of the second medical image data, and/or at least some of the first image feature data set and/or the at least some of the second image feature data set.

14. The image data processing apparatus according to claim 1, wherein the synthesized image data is generated using a trained model that is trained using a discriminator and a classifier, the discriminator is configured to discriminate between synthesized image data and image data and/or feature data used in generating the synthesized image data, and the classifier is used to identify anatomical features of interest, pathologies of interest or other attributes.

15. The image data processing apparatus according to claim 1, wherein the style data is associated with a selected imaging modality and the generating of the synthesized image data is such that the synthesized image data represents an image that has an appearance consistent with being obtained using the selected imaging modality.

16. The image data processing apparatus according to claim 1, wherein the style data is representative of at least one aspect of appearance of a medical image.

17. The image data processing apparatus according to claim 1, wherein at least one of:
a) the processing circuitry is configured to generate the synthesized image data as a training data set for training a machine learning model;
b) the processing circuitry is configured to generate a plurality of synthesized image data sets and the generating of the synthesized image data sets comprises adding at least one pathology to image data derived from normal, non-pathological data sets thereby to provide additional pathological examples in a set of training data sets;
c) the synthesized image data set represents a selected patient or other subject and represents a modified version of the first medical image data or the second medical image data, and at least one of the first medical image data or second medical image data are obtained by scanning the patient or other subject.

18. An image data processing method, comprising:
receiving first medical image data;
receiving second medical image data and/or stored image feature data;
extracting a first image feature data set from the first medical image data,
extracting a second image feature data set from the second medical image data and/or from the stored image feature data;
obtaining style data;
extracting a part of the first image feature data set and a part of the second image feature data set;
synthesizing the part of the first image feature data set and the part of the second image feature data set to obtain a synthesized image data set; and
input the synthesized image data set and the style data to an artificial intelligence (AI) network to generate synthesized image data, wherein
the synthesized image data comprises a hybrid image that includes at least one anatomical feature from the first image feature data and at least one anatomical feature from the second feature image data, and
the synthesized image data set is obtained by performing an arithmetic operation using two or more of content factors Ca, Cb, and Cc, the two or more of content factors Ca, Cb, and Cc being included in the first image feature data set and/or the second image feature data set.

19. A model training apparatus comprising:
processing circuitry configured to:
receive a first image feature data set and a second image feature data set;
generate a mixed feature data set from the first image feature data set and the second image feature data set; and
train a model to generate a synthesized image data set from the mixed feature data set and style data, wherein
the synthesized image data comprises a hybrid image that includes at least one anatomical feature from the first feature image data and at least one anatomical feature from the second feature image data, the first image feature data is extracted from a first medical image data, the second image feature data is extracted from a second medical image data, and the synthesized image data set is generated by performing an arithmetic operation using two or more of content factors Ca, Cb. and Cc, the two or more of content factors Ca, Cb, and Cc being included in the first image feature data set and/or the second image feature data set.

20. A training method, comprising:

receiving a first image feature data set and a second image feature data set;

generating a mixed feature data set from the first image feature data set and the second image feature data set; and training a model to generate a synthesized image data set from the mixed feature data set and style data, wherein the synthesized image data comprises a hybrid image that includes at least one anatomical feature from the first feature image data and at least one anatomical feature from the second feature image data, the first image feature data is extracted from a first medical image data, the second image feature data is extracted from a second medical image data, and the synthesized image data set is generated by performing an arithmetic operation using two or more of content factors Ca, Cb, and Cc, the two or more of content factors Ca, Cb, and Cc being included in the first image feature data set and/or the second image feature data set.

21. An image data processing apparatus comprising:

processing circuitry configured to:

receive first medical image data;

receive second medical image data and/or stored image feature data;

obtain a first image feature data set from the first medical image data;

obtain a second image feature data set from the second medical image data and/or from the stored image feature data;

obtain style data; and generate synthesized image data based on the first image feature data set, the second image feature data set, and the style data, wherein the synthesized image data is generated using a trained model that is trained by minimising adversarial loss and/or by incentivising consistency of background image and/or by incentivising correct classification of anatomical features of interest, pathologies of interest or other attributes, and/or by incentivising consistency of background content prior and after a noise injection.

* * * * *